July 26, 1966    E. J. POITRAS    3,262,609
PRESSURIZED SPRAYER
Original Filed Feb. 14, 1963    3 Sheets-Sheet 1
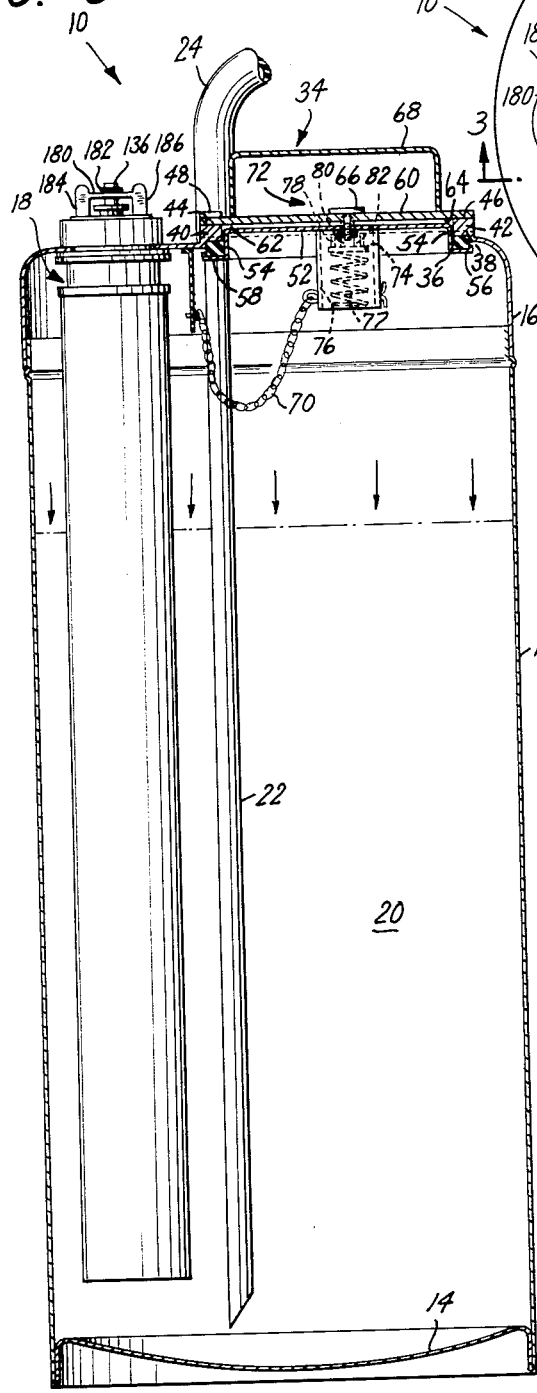
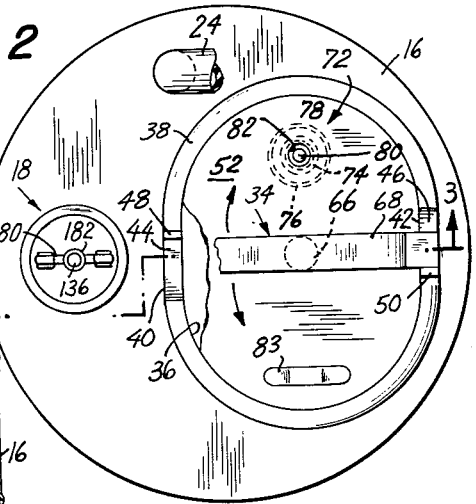
INVENTOR.
EDWARD J. POITRAS
BY
Kane, Dalsimer and Kane
ATTORNEYS July 26, 1966  E. J. POITRAS  3,262,609
PRESSURIZED SPRAYER
Original Filed Feb. 14, 1963  3 Sheets-Sheet 2

INVENTOR.
EDWARD J. POITRAS
BY
Kane, Dalsimer and Kane
ATTORNEYS

July 26, 1966  E. J. POITRAS  3,262,609
PRESSURIZED SPRAYER
Original Filed Feb. 14, 1963  3 Sheets-Sheet 3
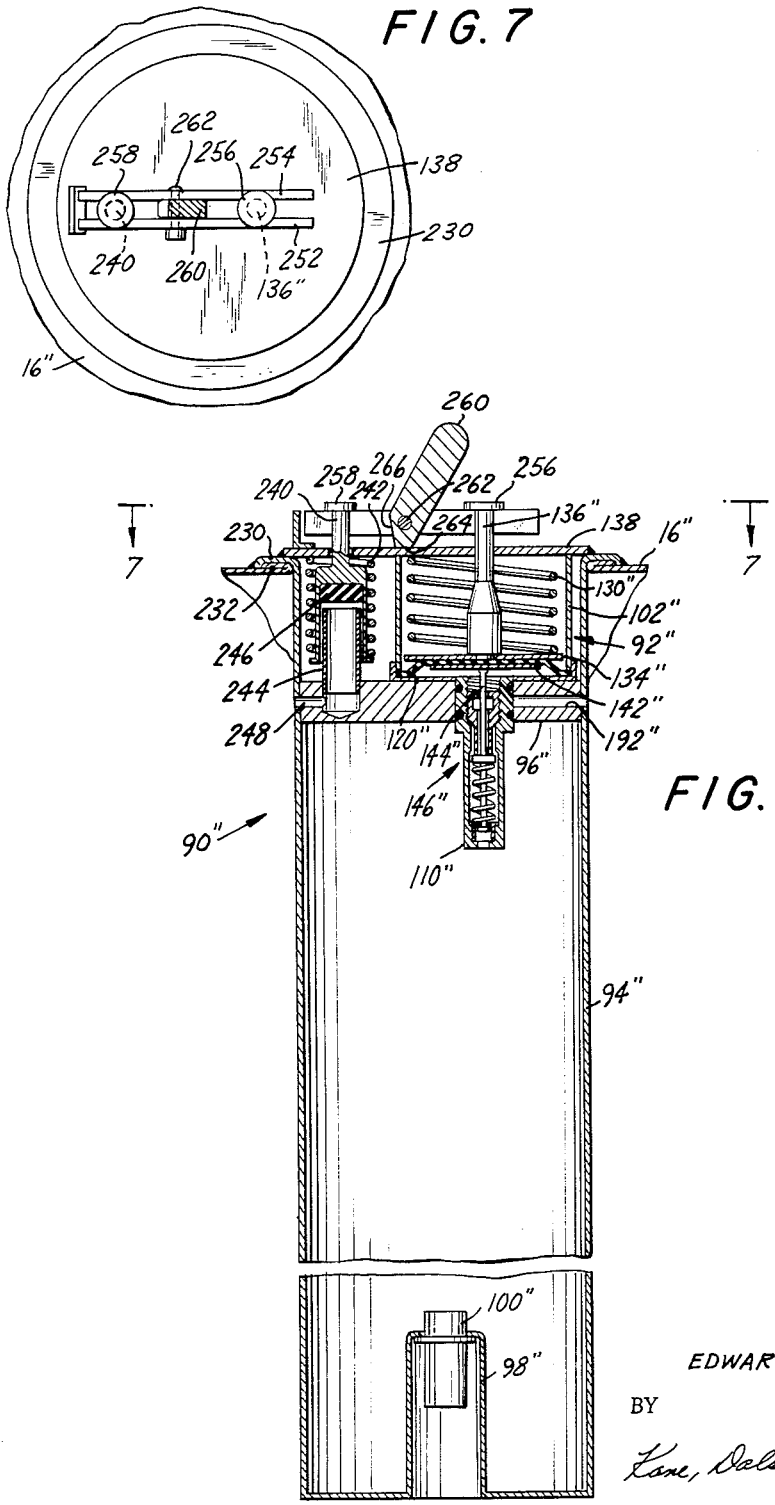
INVENTOR.
EDWARD J. POITRAS
BY
Kane, Dalsimer and Kane
ATTORNEYS

United States Patent Office 3,262,609
Patented July 26, 1966

3,262,609
PRESSURIZED SPRAYER
Edward J. Poitras, 198 Highland St., Holliston, Mass.
Continuation of application Ser. No. 258,389, Feb. 14, 1963. This application Mar. 2, 1965, Ser. No. 440,668
12 Claims. (Cl. 222—399)

This application is a continuation of application Serial No. 258,389, filed February 14, 1963, now abandoned; and the present invention relates generally to pressurized sprayers and, more particularly, to sprayers which, under the influence of a propellant, are capable of prolonged spraying operations. While this invention has many applications, it will be described herein primarily in terms of the pressurization of sprayers for liquids such as the well known garden sprayer.

A well known pattern of sprayer in common use today is termed a compression sprayer. This sprayer basically includes a tank for containing the particular liquid material to be sprayed, as for example, an insecticide or pesticide and the like. The tank is generally filled with the liquid to not more than the three-fourths full level. A hand operated air pressurizing pump is an integral part of the tank and includes the usual plunger rod assembly and operating handle therefor. This pump is used to produce air pressure over the liquid to be sprayed. Pressurization of the tank is accomplished by periodic pumping by the operator until a desired tank pressure is reached. The spray fluid exits because of the air pressure exerted upon it through a dip tube immersed in the tank liquid. The liquid then flows through a flexible hose, a spray control valve at the outer end thereof, an extending lance and ultimately a spray nozzle to the selected target area.

Experience has proven that in dispensing liquid in such manner there is ordinarily a variable decreasing expelling pressure at the spray nozzle which, in turn, results in a corresponding variable flow rate spray pattern for the sprayed liquid. Needless to say, a more constant pressure would produce a constant predictable flow rate and spray pattern. An important factor in effective performance of the sprayer is proper pumping. In pumping, the use of both hands is ordinarily recommended and full, even strokes from top to bottom is dictated in order to minimize work as well as the required force input per stroke. Under these circumstances, considerable time is required to pressurize the tank interior. This cycle is constantly repeated as the pressure drops below a certain desired minimum. If spraying is to be undertaken on a large scale and for extended periods of time, the pumping inevitably will involve much physical effort not to mention the psychological reaction and distraction of the operator.

It is, therefore, a primary object of this invention to provide a pressurized sprayer which is automatic and capable of operating over extended periods of time without the expenditure of time or physical effort in introducing the desired amount of pressure into the sprayer tank.

Another object is to provide a sprayer for a liquid substance to be dispensed in which the sprayer tank interior is exposed to a pressurizing medium functioning as a propellant in expelling the liquid from the tank over prolonged periods of time and at high rates of discharge without danger of propellant "freeze-up."

A further object is to provide such sprayer with a separate supply of the pressurized medium maintained at a pressure above that which the tank interior is subjected and the liquid is sprayed, with interposed control means operating to introduce the medium from the separate supply to the tank interior when the tank pressure falls below a minimum value.

Still another object is to employ a liquid-vapor phase propellant as the pressurized medium in such sprayers such that the medium in the separate power supply is predominantly in the liquid phase and in the vapor phase above the liquid to be sprayed.

An important object is to provide such sprayer with heat transfer means for preventing freeze-up of the propellant which may otherwise occur when the propellant pressure is reduced, said freeze-up occurring because of the heat required to effect the change of phase from liquid to vapor and to expand the vapor to a lower pressure.

Another important object is to provide such a sprayer with a safety interlock whereby the pressure in the separate power capsule is not capable of being inadvertently released when the tank interior is vented for such purposes as refilling the tank with the material to be sprayed.

A still further object is to provide an improved pressure regulator reducing valve between a separate power capsule and tank for liquid to be sprayed.

In accordance with the exemplary embodiment of the inventive sprayer disclosed in detail herein, other objects and advantages will become readily apparent. A unit peculiarly adapted for use as a sprayer includes a tank for the particular liquid to be sprayed. The tank is provided with a removable handle cover for permitting the filling of the tank with the spray liquid. This cover may conveniently mount a safety relief and vent valve for releasing propellant pressure interiorly of the tank thereby facilitating removal of the cover and refilling of the tank with the spray liquid. The usual exit or dip tube is suspended in the tank for transmitting the liquid content, with its inlet and being approximate the bottom of the tank.

A separate power capsule is incorporated in the sprayer and thermally coupled with the interior of the tank while disposed either interiorly or externally of the tank. As will be more fully discussed, this capsule may be permanently mounted and is capable of being conveniently recharged or may be adapted to be uncoupled and then recharged or replaced with a charged capsule. Although the propellant may be selected from a wide number of commercially available materials employed for such purposes, which selection will take into consideration a number of factors such as sprayer use and application, the particularly disclosed exemplary embodiment preferably employs a liquid-vapor phase propellant system.

A pressure regulator is located at the discharge end of the power capsule and serves to expose the liquid in the tank to the propellant at a somewhat reduced pressure sufficient to provide the desired trajectory capabilities and spray patterns. In the instance of use of the liquid vapor phase propellant, the vapor pressure of the propellant above the liquid to be sprayed would be less than that of the vapor existing immediately above the liquid phase in the power capsule. A regulator in the form of a reducing valve, having particular application with this invention, includes a spring depressed diaphragm overlying a metallic disk. This disk is, in turn, operatively connected to a spring loaded valve pin. The bias acting against this pin is balanced against that of the diaphragm spring such that the valve is unseated at the occurrence of a predetermined pressure in the tank interior. A suitable control is included in the regulator valve for permitting the exposure of propellant to the tank interior, on the one hand, and the deactivation of the power capsule, on the other, at the selection of the operator.

This invention contemplates the inclusion of heat transfer means for preventing freeze-up of propellant particularly incident to change in phase and reduction in pressure and prolonged and rapid spraying operations. Accordingly, heat transfer is provided between the exiting propellant from the power capsule and the surrounding saturated propellant vapor. In addition, heat transfer means are incorporated between the tank interior including the liquid to be dispensed and the power capsule as well as the exiting propellant.

In a further embodiment of the invention, a modified regulator and relief valve assembly is employed whereby inadvertent venting of the tank is prevented before the regulator has been turned to its off position.

Other objects and advantages of this invention will become apparent from the following detailed description which is to be taken in conjunction with the accompanying drawings illustrating somewhat preferred embodiments of the invention and in which:

FIG. 1 is a perspective view on a reduced scale of a garden sprayer incorporating the teachings of the present invention;

FIG. 2 is a top plan view of the sprayer on an enlarged scale with certain parts broken away and removed;

FIG. 3 is a sectional view taken along the line 3—3 of FIG. 2;

FIG. 6 is still another fragmentary sectional view illustrating a further embodiment of the invention employing a safety vent control associated with the regulator valve assembly for prohibiting inadvertent venting of the tank before the regulator has assumed its off position; and FIG. 7 is a fragmentary plan view taken along the line 7—7 of FIG. 6.

Figure 5:
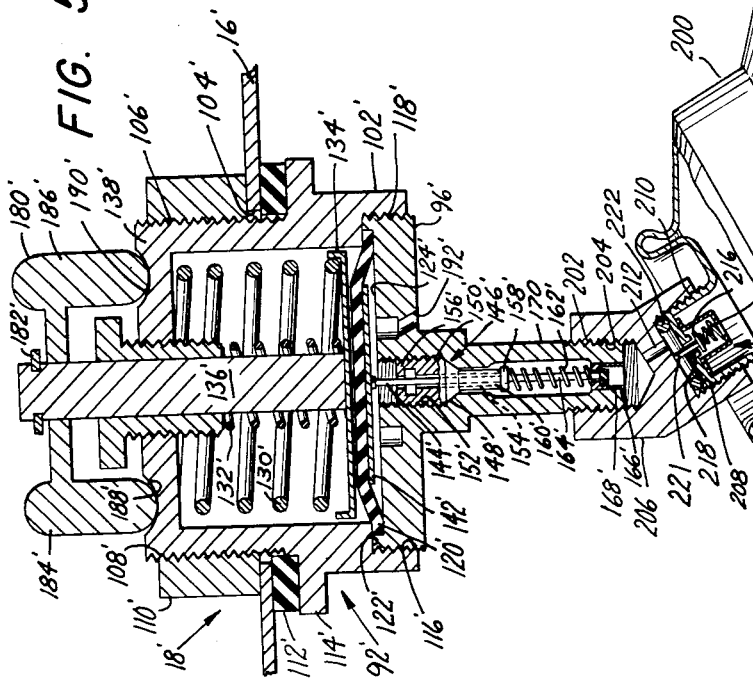
FIG. 5 is a similar enlarged sectional view illustrating a substantially similar regulator valve associated with a power capsule readily removable from the sprayer tank to facilitate capsule replacement when the propellant has been expended.

In the drawings, a sprayer 10 is illustrated as an exemplary embodiment of this invention; and it should be understood that many other applications are intended and embraced by the contemplated contributions to the art. The illustrated sprayer 10 has particular application as a sprayer for spraying insecticides, pesticides or similar liquid media. In this connection, the sprayer 10 includes a substantially cylindrical tank 12 having a sealed base 14 and closed top head 16. A power capsule 18 communicating with the interior of the tank 12, in a manner to be described shortly, is mounted by the head 16 and serves to pressurize the liquid 20 to be sprayed. While under the influence of this internal pressure, the liquid 20 is adapted to travel up through the dip tube 22 also mounted by the head 16 such that its lower end is disposed adjacent the base 14. A flexible hose 24 is suitably coupled with the upper end of the tube 22 for permitting passage of the liquid which is then permitted to pass through hand-operated valve 26. The liquid transmitted through the valve 26 flows through the lance 28 and out through the spray nozzle 30 to the selected target area in accordance with the desired spray characteristics. The tank may, if desired, be carried by the sprayer operator to the desired location by means of the accommodating strap 32.

A handle cover 34 not only conveniently permits ready lifting of the tank 12 but facilitates filling of the tank interior with the liquid to be sprayed. In this connection, the top head 16 is provided with an opening 36 defined by the raised rim 38 of the head. A pair of diametrically opposed raised or stepped cams 40 and 42 project upwardly from the rim. Each of the raised cams includes a substantially flat upper face 44 and 46 terminating in stop lips 48 and 50, respectively. The handle cover 34 is adapted to be removably mounted and secured in place over the opening 36. Accordingly, the cover handle 34 includes a substantially flat central panel or plate 52 having at its periphery a depending skirt 54 from which extends lateral flange 56. This flange serves to support a sealing gasket 58 in a permanent fashion such that when the handle cover 34 is mounted in place over the opening 36 and the flange 56 lifted, the gasket 58 will seal the juncture between the flange 58 and the rim 38.

In order to effect this sealing relationship, the handle cover 34 is provided with an arm 60 having at each end cam followers 62 and 64 engageable with the cams 40 and 42, respectively. The arm 60 is pivotally mounted on a pin 66 extending upwardly from the plate 52. In order to manipulate the follower arm 60, the handle 68 extends upwardly from the arm and is suitably secured or anchored thereto. A chain 70 or other suitable means may extend between the handle cover 34 and internal surfaces of the tank for preventing undesirable disattachment of the cover handle particularly during the tank filling operation.

A pressure relief and vent valve 72, known in the garden sprayer field, is advantageously incorporated into the handle cover structure. This valve 72 comprises basically a spring loaded valve member 74 movable in the valve housing 76 against the influence of the spring 77 to open and close the aperture 78 and, consequently, access to the ambient or closure therefrom. An outwardly extending valve pin 80 extends from the valve member 74 through a suitably provided opening 82 in the plate 52. The valve 72, together with the outwardly projecting end 80 is so located with respect to the cam arm 60 that the arm is capable of engaging the pin, depressing it along with the valve member 72 to permit communication of the opening 78 and, consequently, the tank interior to the atmosphere. Under such circumstances, the tank interior is adapted to be vented. To close the valve, the arm 60 need only be pivoted away from the valve pin 80. A clip 83 may also be provided on the plate 52 for maintaining the arm over the valve pin 80.

When the cover is mounted in place, and it is desired to remove it, the hand gripping portion 68 is grasped and turned to shift the arm 60 into engagement with the valve pin 80 of the air relief valve 72, and the clip 83. All of the pressure within the tank interior is permitted to escape through the valve. When the pressure is fully released, the cover handle 34 will drop a short way into the tank interior or do so under the influence of slight finger pressure. When the pressure is exhausted, the cover handle can quickly be withdrawn from the tank.

To close the tank, the cover handle should be so arranged that the cam arm 60 is seated over the air relief valve 72 and the retaining clip 83. The cover is then inserted in the opening 36 and pulled up with the gasket 58 seating under the opening rim. The handle is turned to lock the cam follower 60 over the cams 40 and 42.

In order to pressurize the liquid 20 to be sprayed and maintain it under constant pressure so that a predictable and unvarying spray pattern within permissible limits is obtained, the top of the tank interior contains a pressurized medium in the form of propellant. In accordance with this invention, the propellant in the tank is maintained at a predetermined pressure and emanates from the pressure capsule 18. In a preferred embodiment, the propellant within the capsule 18 is at an elevated or higher pressure. An interposed pressure control regulator valve at the discharge end of the pressure capsule 18 serves to expose the tank interior to the propellant in the capsule when the pressure therein drops below the predetermined level.

Referring now to the pressure capsule 18, it will be appreciated that this capsule is conveniently mounted on the top head 16. It should be understood at this time that the capsule may be removably mounted such that it may be recharged with the pressurized medium at the desired pressure or replaced with another fresh capsule. On the other hand, the mounting may be such that the capsule may be advantageously recharged in place.

Figure 4:
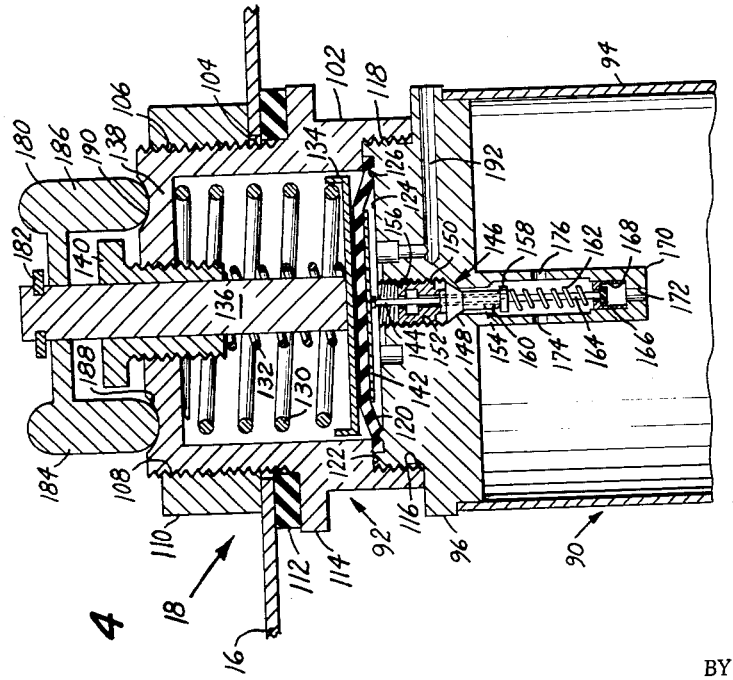
FIG. 4 is an enlarged sectional view of a pressure capsule for a propellant showing the details of a regulator valve operable to maintain predetermined pressures in the sprayer tank interior.

In the embodiment of power capsule 18 illustrated in detail in FIG. 4, a propellant container 90 is coupled with the discharge end of a pressure control regulator valve 92. The container includes an elongated tube 94 having a cover 96 and base suitably secured in place so as to provide a hermetic seal along the connected surfaces. Base 98 is provided with a filling valve 100 of the Schrader type commonly employed on pneumatic automobile tires and inner tubes. This valve facilitates the charging and recharging of the container 90 with the selected propellant.

The regulator valve 92 is attached to the container cap 96 and cooperates in providing the direct connection of the capsule 18 to the tank head 16. In this connection, the regulator valve 92 includes a cap 102 projecting through the opening 104 provided in the tank head 16. The cap is formed with external threads 106 which are adapted to mesh with the internal threads 108 of the nut 110 in securing the cap and, consequently, the power capsule 18 to the tank head 16. An annular gasket 112 is interposed between the circumferentially extending shoulder 114 of the cap and the adjacent internal faces of the tank head 16 to provide a hermetic seal at this junction. The base of the cap 102 is internally threaded and conveniently mates with the external corresponding threads 118 of the container cover 96.

The regulator valve 92 includes an internally mounted diaphragm 120 having its periphery secured in place between the internal shoulder 122 of the cap 102 and the recess portion 124 at the top of the container cap 96, with the annular lip 126 serving to further secure the diaphragm periphery. The diaphragm 120 is biased downwardly by the force of the springs 130 and 132 both of which are pressed against the shallow cup 134 forming an integral part of the valve stem 136. As will be observed, the shallow cup 134 serves to transmit the spring force directly to the diaphragm 120. The other end of spring 130 is biased against the inner face of the top 138 of the cap 102. The concentrically mounted spring 132, on the other hand, is adjustable and bears against the adjustable pressure regulator nut 140 threadedly engaged with the corresponding threads of the top 138 of the cap 102. The underside of the diaphragm 120 is associated with a metallic disk 142 which bears against the valve pin 144 of the discharge or outlet valve assembly 146. Conveniently this valve may also be in the nature of a conventional automobile tire valve such as the commercially available Schrader valve.

Thus, the valve assembly 146 includes a bored member 148 having an externally threaded upper portion 150 secured in the corresponding internal threaded bore 152 in the container cover 96. The internal bore 154 of the member 148 possesses a diameter larger than that of the valve pin 144 whereby free movement of the pin 144 therein is permitted as well as propellant vapor. The radially inwardly extending projections 156 serve to align the valve pin 144 substantially coaxially. A disk 158 is adapted to cooperate with the lower edge of the reduced boss 160 in sealing off the bore 154 from the interior of the container 90. This disk may simply be in engagement with the lower end of the valve pin 144 or, on the other hand, be secured thereto such that upon depression of the pin 144, the disk 158 will unseat and expose the bore 154 to the container interior. In this connection, the disk 158 is biased upwardly by means of the spring 162 surrounding the pin 164 which may be secured to the disk 158 or, for that matter, be an extension of the valve pin 144. Be that as it may, the lower end of the pin 164 is adapted to be movable in a spacer member 166 to maintain the aligned concentric relationship of the pin 164. This spacer member 166 may be mounted in the internal bore 168 of a downwardly projecting boss forming an integral part of the container cover 96. This box 170 conveniently houses the base of the valve assembly 146 and is provided with a number of strategically located apertures, as for example, apertures 172, 174 and 176 for permitting the propellant or pressurized medium in the container 90 to pass freely into the bore 154 when the disk 158 is unseated.

Through the selection and calibration of the springs 130 and 132, together with the known effective area of the diaphragm 120, the regulating pressure of the regulator valve 92 may be adjusted to the desired value by manipulating the adjusting nut 140. Under such circumstances, the propellant in the container 90 may be charged to a much higher pressure than that desired in the tank interior for expelling the contents 20.

A safety on–off control is associated with the regulator valve 92 for deactivating the power capsule and, consequently, prevent the contained pressurized medium from entering the tank interior and, on the other hand, permit the intended operation of the regulator valve 92 to pressurize the tank interior. Accordingly, a control knob 180 is pivotally mounted on the exposed end of the valve stem 136 and locked thereon by means of the key or lock washer 182. The knob includes a pair of downwardly and diametrically opposed projections 184 and 186 which are adapted to ride on the upper surface of the cap top 138 as well as into the complementary recesses 188 and 190, respectively. In the off position, the projections 184 and 186 are rotated out of association with their respective accommodating recesses 188 and 190, thereby forcing the valve stem 136 and, consequently, cup 134 upwardly against bias of the springs 130 and 132. This action causes the disk 142 to leave contact with the valve pin 144 so that the disk 158 assumes its sealing position with respect to the lower end of the boss 160 due to the action of the spring 162. Under these circumstances, the outlet valve assembly 146 will be in a closed position. When it is desired to permit the power capsule 18 to pressurize the tank interior, the knob 180 is rotated so that the projections 184 and 186 fall into the recesses 188 and 190, respectively. Under these circumstances, the diaphragm 120 will be under the influence of the springs 130 and 132.

The lower face of the diaphragm 120 which is associated with the disk 142 is adapted to sense the propellant pressure within the tank interior through the interconnected outlet passageway 192 formed in the cover 96 of the container 90. When tank pressure is reduced incident to the spraying operation, the diaphragm 120 will flex downwardly by the springs 130 and 132. The valve assembly 146 will open, by the disc 158 moving away from the lower edge of the boss 160, thereby permitting the propellant in the container 90 to discharge through the passageway 192 into the tank interior until such time as the pressure builds up to the desired value. When this occurs, the pressure acting on the lower face of the diaphragm 120 will overcome the bias of the springs 130 and 132 thereby causing the disk 158 to seal against the lower end of the boss 160 to close the valve assembly 146.

Although this invention contemplates the employment of any one of a wide variety of pressurizing mediums, particularly those that are commercially known and available, a propellant found suitable especially in the disclosed type of sprayer, embraces a liquid-vapor phase system such as the well known fluorinated hydrocarbon propellants termed "Freon" discussed in detail in literature entitled "Packaged for Profit" published by the manufacturer, E. I. du Pont de Nemours & Co. Inc., Wilmington, Delaware. With respect to spraying, it is desirable to spray at a constant pressure in order to have a predictable spray pattern independent of the ambient temperature. In addition, such spray pattern can normally be obtained by subjecting the tank contents to a pressure substantially below the normal vapor pressure of the liquid-vapor phase propellant. As indicated in the above, the gas vaporized from the propellant that is charged in the pressure capsule 18 into the fluid state is utilized in pressurizing the tank interior. This gas pressure is reduced through the operation of the regulator valve 92. In practice, Freon–12 disclosed in "Thermodynamic Properties of Freon–12" published by the manufacturer, E. I. du Pont de Nemours & Co. Inc., Wilmington, Delaware, served to produce a predictable, relatively constant and acceptable spray pattern. The pressure within the tank interior was maintained at approximately 30 p.s.i.a. while the Freon–12 was charged in the container 90 to its vapor phase pressure of 91.7 p.s.i.a. at 75° F. Since the vapor-phase pressure or the absolute pressure varies with temperature, it should be appreciated that the absolute vapor pressure ranges from 72 to 114 p.s.i.a. as the temperature ranges from 60° to 90° F. Under the contemplated tank interior pressure conditions, the practice of the present invention permits the utilization of materials of less structural strength for the fabrication of the tank such as the inexpensive plastics which would include polyethylene.

In vaporizing the propellant, heat energy is required, this being defined in terms of the latent heat of vaporization. In addition, the expansion of the vapor incident to its release from the power capsule 18 into the tank interior through the regulator valve 92 also necessitates the utilization of heat energy. Under conditions of high rate of discharge of a liquid to be sprayed, the heat energy required in both vaporizing the propellant and reducing its pressure, freezing of propellant particularly at the regulator valve 92 is a serious problem considered and overcome by this invention so that uninterrupted spraying of the tank contents 20 is realized. Accordingly, freezing-up is prevented by automatically supplying the required heat energy with the result that large amounts of propellant at the desired pressure below the vapor-phase pressure value may be produced for prolonged spraying operations.

First of all, the propellant container 90 is made to extend to a point near the bottom or base 14 of the tank so that the liquid propellant in the liquid phase is warmed by the surrounding liquid 20 to be sprayed to thereby aid in offsetting the cooling effect resulting from the vaporization process. Secondly, the downwardly extending boss 170 and the parts of the valve assembly 146 that it encases, particularly the entrance into the bore 154, is surrounded by the saturated vapor of the propellant in the container 90. Thus, as cooling takes place through vapor expansion, the surrounding saturated propellant vapor condenses on the surfaces of the boss 170 thereby giving up latent heat. This condensed liquid flows down the surfaces of the boss 170 and drops into the liquid phase propellant below. Obviously, this is a continuous cycle which maintains the desired temperature conditions.

In a typical sprayer having a tank of ten quart capacity, with a one quart power capsule 18, the heat energy required to spray a tank full of water solution at 30 p.s.i.a., lowered the water temperature only about 1° F. After the tankful of liquid was sprayed, the regulator control knob was rotated to its off position, the tank vented by opening the vent valve 72 and the cover 34 removed. The interior of the tank is then filled to the desired level with the liquid to be sprayed, the cover 34 secured in position, the vent valve 72 closed and the regulator control knob 180 turned to the on position. The tank interior will again be promptly pressurized and the spraying operation resumed. The cycle of operation is repeated as frequently as desired until such time as the pressurized medium of the power capsule 18 is fully expended. The capsule may either be recharged or replaced with a fresh loaded capsule. In the typical sprayer mentioned in the above employing a ten quart tank and one quart power capsule containing Freon–12 and an expellant pressure of 30 p.s.i.a. at 80° F., one charge of propellant operated to spray about 12 tankfuls of liquid. The advantage of such a self contained power sprayer is obvious.

In certain applications, it will be desirable to have the propellant in a separate container and quite distinct from the regulator valve so that it may be attached and detached readily. Thus, in another contemplated embodiment of the invention illustrated in FIG. 5, a replaceable container 200 for the propellant supply is adapted to be coupled with the regulator valve 92′. For the sake of brevity, component parts constituting this control regulator control valve 92′ having counterparts in the regulator valve 92 illustrated in detail in FIG. 4 will be similarly numbered but accompanied with primes. In this embodiment, the boss 170′ is provided with external threads 202 for mating with a tapped opening 204 of an adapter 206. This adapter contains another tapped opening 208 at its other end for receiving the externally threaded cap 210 of the container 200. A passageway 212 in the adapter 206 serves to interconnect one tapped opening with the other. A closure valve assembly 214 is provided on the cap 210 and may include a closure disk 216 biased towards the outlet opening 218 by a spring 220. A pin 221 secured to either the disk 216 or the adapter 208 serves to unseat the valve disk 216 to expose the container contents to the ports of the regulator valve 92′ when the cap 200 is threaded into the adapter 206. In this connection, an O-ring 222 may be interposed between the top of the cap 210 and the base of the tapped opening 208 to complete the seal between these parts and prevent any inadvertent seepage or leakage of the pressurized medium therebetween. Once the container 200 is properly mounted in place in this fashion, the operation of the parts illustrated in FIG. 5, together with the mounting spire, will be readily obvious to those skilled in the art. This particular embodiment of the invention is peculiarly adapted for use by the home owner in his garden. It would be more convenient in this instance to obtain the propellant in replacement cartridges or containers. For professional and industrial usage, it would probably be preferred to use the embodiment of the invention of FIG. 4 wherein a power capsule 18 would be recharged with propellant from a central supply tank.

This invention further contemplates mechanisms for preventing the venting of the tank sprayer interior before the regulator valve has been placed in its off position thereby preventing any inadvertent release of the pressurized medium in the power capsule. In FIGS. 6 and 7, an interlock assembly for the regulator valve and tank vent means is provided for such purpose. In this embodiment, those parts having corresponding counterparts discussed in connection with the other embodiments herein will be identified with like numerals followed by double primes to avoid any unnecessary repetition. Thus, the regulator valve 92″, together with its closure valve assembly 146″, is identical in function with those regulator valves previously described. The power capsule 90″ having incorporated therein this regulator valve 92″ is provided with tubular side wall 94″ which extends upwardly to encase the regulator and relief valves as shown and serves to couple the capsule to the tank cover 16″ through interconnected rolled flanges 230 and 232. Alternatively, suitable welding or brazing operation may be employed to hermetically seal these parts. The valve cap 102 for encasing the spring 130″ and valve stem 136″ serves to anchor the peripheral edge of the diaphragm 120″ to the container cover 96″. This cap 102″ in this instance includes a somewhat enlarged top 138″ the periphery of which is suitably secured to the flange 230 in an hermetic fashion.

The vent valve, on the other hand, includes a valve stem 240 biased downwardly from the top plate 138″ by a spring 242. The stem is mounted over an upwardly extending tube 244 with sufficient clearance provided between their respective opposed walls to permit passage therethrough of the pressurized medium in the tank when it is desired to vent the tank interior. The stem includes an interiorly set resilient disk 246 which is adapted to seal the upper end of the tube 244 during normal operation of the sprayer. The tube 244 communicates with passages 248 communicating with the tank interior. Thus, when the valve stem 240 is raised against the bias of the spring 242, the propellant in the tank will be vented through the passageway 248 through the tube 244 out through the space between the stem 240 and tube 244 and ultimately through a suitably formed opening in the top 138″. This opening may partake of a clearance provided between the stem 240 and the top.

A valve stem actuator assembly is mounted on the top plate 138″ for raising the regulator valve stem 136 and vent valve stem 240 to place the regulator valve 92″ in an off position and the vent valve in an open position for relieving the internal pressure of the tank. This assembly is also adapted to release both of the valve stems to place them under the influence of their associated springs to close the vent valve and also render the regulator valve operational. Accordingly, the actuator assembly will include a pair of spaced bars 252 and 254 embracing each of the stems and disposed beneath their respective enlarged heads 256 and 258. A lever 260 is pivotally mounted by pin 262 extending between the bars 252 and 254. The lever 260 includes a pair of converging bevelled edges 264 and 266 each capable of resting on the upper face of the top 138″ depending upon the direction of pivoting of the lever 260. Thus, when the edge 264 is resting on the upper face of the top 138″, the valve stems 136 and 240 are raised to deactivate the regulator valve 92″ and open the vent valve. When the edge 266 rests on the top face of the plate 138″, the valve stems are released to close the vent valve and permit the regulator valve to function normally. In passing, the spring 242 may be calibrated to such a value that when an overabundance of pressure is created in the tank interior, the bias of the spring will be overcome to vent the tank interior and reduce the tank pressure to the desired value. As will be evident, this valve arrangement prevents inadvertent venting of the tank before the regulator has been turned to the off position.

Thus, the aforenoted objects and advantages are most effectively attained. Although somewhat preferred embodiments of the invention have been described in detail, it should be understood that this invention is in no sense limited thereby but is to be determined by the scope of the appended claims.

I claim:

1. A dispenser comprising in combination: a tank for a liquid substance to be expelled, said tank having a bottom and a valve controlled outlet through which the liquid substance is expelled under the influence of a propellant at a predetermined pressure; a separate power capsule having a lower part and being mounted interiorly of said tank such that the lower part thereof is adapted to be immersed in said liquid substance at the bottom of the tank and having a discharge end communicating with the interior of the tank, said capsule having walls of good thermal conductivity, said capsule adapted to contain said propellant at a pressure above said predetermined pressure and in a liquid-vapor phase; a regulator valve at the discharge end of said capsule for controlling the introduction of the propellant in said capsule into the tank interior when the propellant pressure in the tank falls below a predetermined value; heat transfer means between the capsule and the liquid substance for maintaining the temperature of the propellant during the operation of said valve at substantially the temperature of said liquid substance; and further heat transfer means for maintaining the temperature of said valve at substantially the temperature of the propellant.

2. The invention in accordance with claim 1 wherein said further heat transfer means includes a condensation surface on which the propellant in vapor-phase is adapted to condense to give up heat as the temperature at the regulator valve drops.

3. The invention in accordance with claim 2 wherein means are provided for directing the condensed propellant to the propellant in liquid-phase in the capsule.

4. The invention in accordance with claim 1 wherein said outlet includes a dip tube having an upper end and a lower end adapted to be immersed in liquid to be sprayed, a flexible hose coupled with the upper end of said tube at one end thereof, a manually controlled valve at the other end of said hose for selectively closing the passage of the liquid therethrough and permitting the passage of the liquid therethrough, a lance having a discharge end extending from said manually controlled valve for transmitting the liquid passing through the manually controlled valve, and a nozzle at the discharge end of said lance for direction of the liquid to a target area in a predictable spray pattern.

5. The invention in accordance with claim 1 wherein said power capsule comprises an elongated tube having a sealed base at one end adjacent the bottom of the tank, and a valve means on said base for charging said capsule with propellant at a pressure above said predetermined pressure, and said regulator valve being at the top end of said tube.

6. The invention in accordance with claim 1 wherein adapter means are interposed between said discharge end of said capsule and the regulator valve for facilitating the removal of said capsule after the propellant has been expended and replacement with a capsule charged with propellant.

7. The invention in accordance with claim 1 wherein a cap is at the discharge end of said capsule, means for coupling said cap to the top of said tank and control means on said cap operable from the exterior of the tank for closing the regulator valve to render it insensitive to propellant pressure in said tank.

8. The invention in accordance with claim 7 wherein a removable cover forms part of the top of the tank, vent means is operatively connected with the top of the container for venting the interior of the tank to permit removal of the cover and refilling of the tank with the liquid to be sprayed.

9. The invention in accordance with claim 8 wherein said control means is also operatively associated with said vent means such that when the control means is operated to close the regulator valve, the vent means is simultaneously actuated to vent the tank, and the control means is further operable to close the vent means and simultaneously release the regulator valve to render it sensitive to propellant pressure in the tank.

10. The invention in accordance with claim 1 wherein said regulator valve includes a diaphragm, aperture means to expose one side of said diaphragm to propellant pressure inside the tank, spring biasing means and atmospheric pressure acting on the other side of said diaphragm, a port closure means coupled with the diaphragm such that when the propellant pressure inside the tank falls below the predetermined pressure the biasing means shifts said diaphragm to open the port closure means and permit the propellant in the capsule to be introduced into the tank interior and when the pressure in the tank interior is above the predetermined pressure, the diaphragm is shifted against the bias of the spring biasing means to close the port closure means and stop the discharge of propellant from the capsule into the tank.

11. The invention in accordance with claim 10 wherein said valve includes an adjusting means for adjusting the bias of the spring biasing means to correspondingly adjust the amount of propellant pressure in the tank required to shift the diaphragm to close the closure means.

12. A dispenser comprising in combination: a tank for a liquid substance to be expelled, said tank having a valve controlled outlet through which the liquid substance is expelled under the influence of a propellant at a predetermined pressure; a separate power capsule mounted interiorly of said tank such that a part thereof is adapted to be immersed in said liquid substance and having a discharge end communicating with the interior of the tank, said capsule having walls of good thermal conductivity and being coextensive in length with the walls of the tank, said capsule adapted to contain said propellant at a pressure above said predetermined pressure and in a liquid-vapor phase; a regulator valve at the discharge end of said capsule for controlling the introduction of the propellant in said capsule into the tank interior when the propellant pressure in the tank falls below a predetermined value; heat transfer means between the capsule and the liquid substance for maintaining the temperature of the propellant during the operation of said valve at substantially the temperature of said liquid substance; and further heat transfer means for maintaining the temperature of said valve at substantially the temperature of the propellant.

References Cited by the Examiner

UNITED STATES PATENTS

| | | | |
|---|---|---|---|
| 968,736 | 8/1910 | Brent | 222—399 |
| 2,009,467 | 7/1935 | Amsdell | 222—399 X |
| 2,039,704 | 5/1936 | Clark et al. | 222—399 X |
| 2,162,057 | 6/1939 | Brandt et al. | 239—154 |
| 2,514,773 | 7/1950 | Kromer | 222—399 X |
| 2,571,433 | 10/1951 | Fine et al. | 222—399 X |
| 2,689,150 | 9/1954 | Croce | 239—308 |
| 2,973,885 | 11/1962 | Ferguson. | |
| 3,109,558 | 11/1963 | Yetter | 222—373 X |

RAPHAEL M. LUPO, *Primary Examiner.*